(12) United States Patent
Roh et al.

(10) Patent No.: US 7,745,043 B2
(45) Date of Patent: Jun. 29, 2010

(54) FUEL CELL STACK

(75) Inventors: Gill-Tae Roh, Yongin-si (KR);
Yeong-Chan Eun, Yongin-si (KR);
Seong-Jin An, Yongin-si (KR);
Seok-Rak Chang, Yongin-si (KR);
Jun-Ho Sauk, Yongin-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 21 days.

(21) Appl. No.: 12/038,597

(22) Filed: Feb. 27, 2008

(65) Prior Publication Data

US 2008/0299440 A1 Dec. 4, 2008

(30) Foreign Application Priority Data

May 31, 2007 (KR) .................. 10-2007-0053273

(51) Int. Cl.
*H01M 2/16* (2006.01)
(52) U.S. Cl. .................................... 429/143
(58) Field of Classification Search .......... 429/12, 429/34, 35, 37, 143, 147, 149, 157, 186, 429/144; *H01M 8/00, 8/02, 2/00, 2/02, 2/08*
See application file for complete search history.

(56) References Cited

U.S. PATENT DOCUMENTS

2005/0095485 A1* 5/2005 Saulsbury et al. ............ 429/32
2005/0277007 A1* 12/2005 Yoshitake et al. ............ 429/32
2006/0234105 A1* 10/2006 Suh .............................. 429/34

FOREIGN PATENT DOCUMENTS

KR 2001-0057896 7/2001
KR 10-2006-0108921 10/2006

OTHER PUBLICATIONS

Korean patent abstracts for publication 1020010057896 dated Jul. 5, 2001 in the name of Jong Hyeon Lee.
Korean patent abstracts for publication 1020060108921 dated Oct. 18, 2006 in the name of Dong Myung Suh.

* cited by examiner

*Primary Examiner*—Jerry Lorengo
*Assistant Examiner*—Carlos Barcena
(74) *Attorney, Agent, or Firm*—Christie, Parker & Hale, LLP

(57) ABSTRACT

A planar fuel cell stack, having generators that generate electricity by an electrochemical reaction of a fuel and an oxidizing agent, the generators arranged on a same plane. A beading unit and a protruding portion are formed on a fastening plate and a separator so as to improve structural stiffness thereof. Accordingly, the constituent elements of the stack are fastened with a substantially uniform conjoining pressure compared to a conventional planar stack, and the thickness of the stack of the present invention can be thinner than that of the conventional planar stack.

21 Claims, 8 Drawing Sheets

FUEL CELL STACK

CROSS-REFERENCE TO RELATED APPLICATION

This application claims priority to and the benefit of Korean Patent Application No. 10-2007-0053273 filed in the Korean Intellectual Property Office on May 31, 2007, the entire content of which is incorporated herein by reference.

BACKGROUND OF THE INVENTION

1. Field of the Invention

The present invention relates to a fuel cell stack that generates electricity by an electrochemical reaction, and more particularly, it relates to a planar fuel cell stack having generators arranged in a plane surface.

2. Description of the Related Art

A fuel cell is a generator that generates electrical energy by an oxidation reaction of a fuel and a reduction reaction of an oxidizing agent. Fuel cell can be classified as a polymer electrolyte membrane fuel cell or a direct oxidation fuel cell according to the type of fuel used.

The polymer electrolyte membrane fuel cell is supplied with a reformed gas that is reformed from a liquid fuel or a gas fuel, and an oxidant gas such as air. In addition, the polymer electrolyte membrane fuel cell generates electrical energy by an oxidation reaction of the reformed gas and a reduction reaction of the oxidant gas. Such a polymer electrolyte membrane fuel cell has superior output characteristics, and can operate at a relatively low temperature. In addition, the polymer electrolyte membrane fuel cell has fast starting and response characteristics. Therefore, the polymer electrolyte membrane fuel cell is widely used as a power source for vehicles, a distributable power source for buildings, and a compact power source for electronic devices.

The direct oxidation fuel cell receives a liquid fuel and an oxidant gas (e.g., air), and generates electrical energy by an oxidation reaction of the fuel and a reduction reaction of the oxidant gas.

A typical fuel cell includes a generator which is a primary unit that generates electrical energy. The generator includes a membrane-electrode assembly (MEA) and separators disposed at opposite sides of the MEA. In addition, a plurality of the generators can be consecutively arranged, forming one stack.

A conventional fuel cell stack has a plurality of generators cascaded in series. This type of fuel cell stack requires multiple generators for a high output fuel cell stack, and accordingly, the stack becomes thicker.

A planar fuel cell stack having generators arranged on a plane surface has been suggested. However, the planar fuel cell stack has a relatively large planar area to thickness ratio so that it is difficult to fasten the generators and fastening plates that protect the generators with substantially uniform conjoining pressure. Furthermore, the planar fuel cell stack generators, the fastening plates and the separators are often made thinner to reduce overall weight of the stack. Then, conjoining pressure at locations removed from fastening points becomes relatively weaker than conjoining pressure at locations closer to the fastening points, causing gaps to be formed between the MEAs and the separators. Moreover, since oxidant holes are made on the fastening plate to allow external air to reach a cathode electrode of the MEA, the fastening plate becomes even harder to be fastened to the separators with uniform pressure.

The above information disclosed in this Background section is only for enhancement of understanding of the background of the invention, and therefore, it may contain information that does not form the prior art that is already known in this country to a person of ordinary skill in the art.

SUMMARY OF THE INVENTION

The present invention has been made in an effort to provide a fuel cell stack having an advantage of improving structural stiffness of a fastening plate and a separator to thereby fasten constituent elements of the stack with relatively uniform pressure.

An exemplary fuel cell stack according to one embodiment of the present invention includes a plurality of generators. Each generator includes a membrane-electrode assembly (MEA), a first separator, and a second separator. The first separator is on one side of the MEA and has an oxidant hole for receiving an oxidizing agent. The second separator is on the other side of the MEA and has a fuel channel on a side facing the MEA. The plurality of the generators are consecutively arranged on a same plane. The stack further includes a first fastening plate and a second fastening plate. The first fastening plate is on one side of the generators for covering the plurality of first separators, and the second fastening plate is on the other side of the generators for covering the plurality of second separators. The first fastening plate includes a first beading unit formed by bending a portion of the first fastening plate, the first beading unit protruding from the first fastening plate in a thickness direction of the first fastening plate. A plurality of the first beading unit may be consecutively formed on the same side of the first fastening plate.

In addition, the first beading unit may correspond to a protruding portion protruding from one side of the first fastening plate in a thickness direction of the first fastening plate.

Further, the first separator may include a second beading unit formed by bending a portion of the first separator, the second beading unit protruding from the first separator in a thickness direction of the first separator, and the second beading unit may match a concave portion of the first beading unit of the first fastening plate. A plurality of the second beading units may be consecutively formed on the same side of the first separator.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention.

Figure 1:
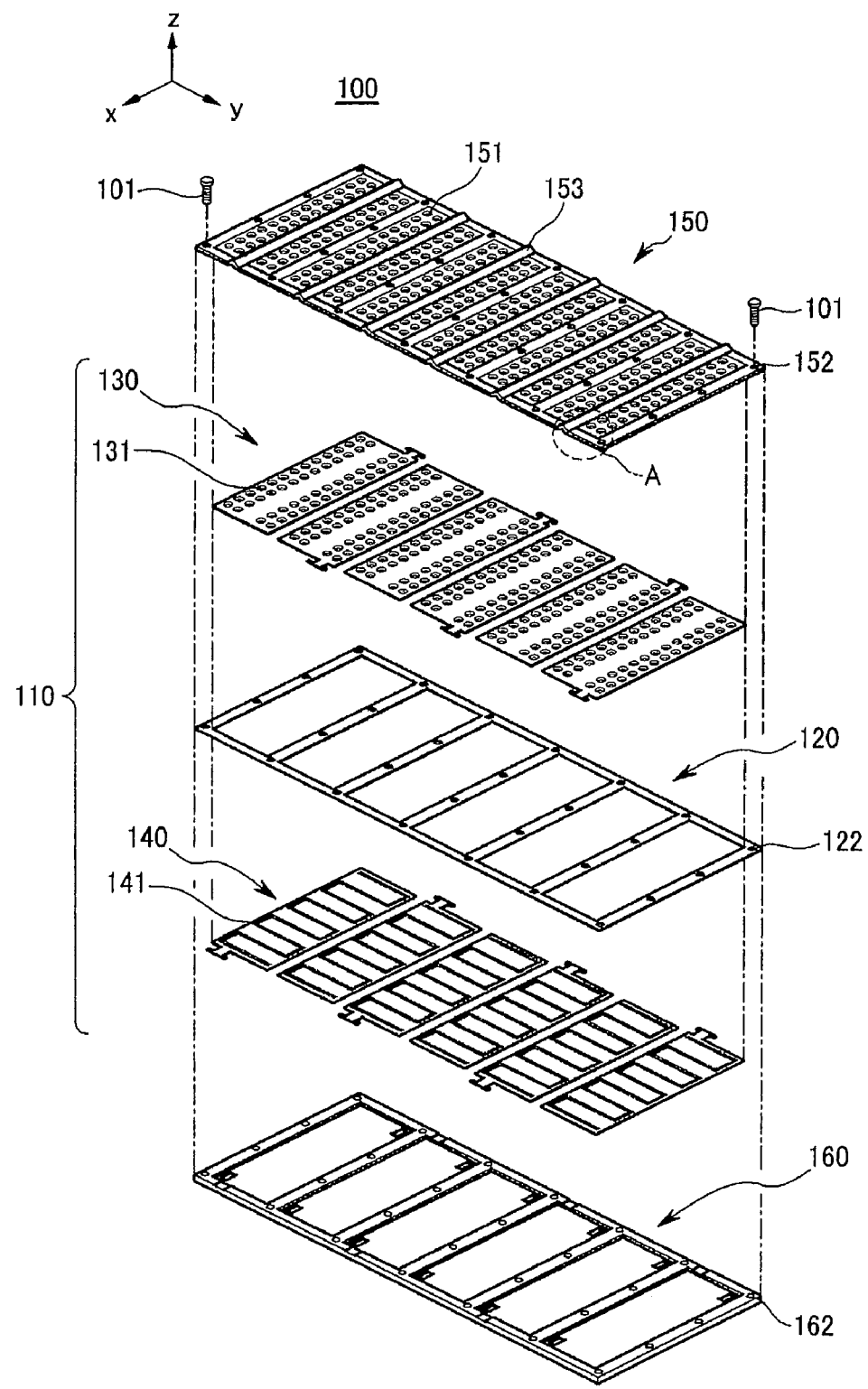
FIG. 1 is an exploded perspective view of a fuel cell stack according to a first exemplary embodiment of the present invention.

FIG. 1 is an exploded perspective view of a fuel cell stack according to a first exemplary embodiment of the present invention.

As shown in FIG. 1, the fuel cell stack 100 according to the first exemplary embodiment includes a generator 110 that receives a fuel and an oxidant gas, and generates electrical energy by an oxidation reaction of the fuel and a reduction reaction of the oxidant gas. In this exemplary embodiment, an alcohol-containing fuel (e.g., methanol, or ethanol) is used as the fuel, and air can be used as the oxidant gas. The generator 110 is a primary unit that generates electricity, and is also referred to as a "unit cell".

The generator 110 includes a membrane-electrode assembly (MEA) 120 including a cathode electrode, an anode electrode and an electrolyte polymer film, a cathode separator 130 (hereinafter referred to as a "first separator"), and an anode separator 140 (hereinafter referred to as a "second separator"). The cathode electrode and the anode electrode of the MEA 120 are respectively attached to lateral sides of the electrolyte polymer film. The anode electrode divides the fuel into electrons and protons by an oxidation reaction of the fuel. The protons moves through the electrolyte polymer film to the cathode electrode, where the cathode electrode generates a reduction reaction with the protons and the oxidant gas.

The first separators 130 are attached to a first side of the respective polymer electrolyte films, and the second separators 140 are attached to a second side of the respective polymer electrolyte films. In the described embodiment, the first separators 130 are made of a stainless material having excellent corrosion resistance, and are respectively formed in a plate structure that faces the respective cathode electrodes of the MEAs 120. Each first separator 130 includes a plurality of first penetrating oxidant holes 131 through which an oxidizing agent is supplied to the corresponding MEA 120. In the described embodiment, the second separators 140 are made of a stainless material having excellent corrosion resistance, and are respectively formed in a plate structure that faces the respective anode electrodes of the MEAs 120. Fuel channels 141 are formed on the same surface as the respective second separators 140 to supply fuel to the corresponding MEAs 120.

A plurality of generators 110 are consecutively formed on the same plane surface. Therefore, the fuel cell stack 100 according to the present exemplary embodiment is also called a planar stack.

The fuel cell stack 100 includes a first fastening plate 150 and a second fastening plate 160 for protecting the generators 110, and are fastened to each other.

The first fastening plate 150 is disposed on one side of the generators 110 and covers the plurality of first separators 130. On the first fastening plate 150, a plurality of second oxidant holes 151 are formed in correspondence with the first penetrating oxidant holes 131 of the respective first separators 130. Accordingly, external air can reach the cathode electrodes of the MEAs 120 through the first penetrating oxidant holes 131 and the second oxidant holes 151.

The second fastening plate 160 is disposed on the other side of the generators 110 and covers the plurality of second separators 140. The second fastening plate 160 houses the second separators 140 inside thereof, and a hydrogen-containing fuel supplied from a fuel supply can reach the fuel channels 141 of each of the second separators 140.

The generators 110, the first fastening plate 150, and the second fastening plate 160 are fastened to each other by at least one fastening member 101 (e.g., a bolt). A plurality of first fastening holes 122 are formed in the MEAs 120 of the generators 110, a plurality of second fastening holes 152 are formed in the first fastening plate 150, and a plurality of third fastening holes 162 are formed in the second fastening plate 160. The first fastening holes 122, the second fastening holes 152, and the third fastening holes 162 are respectively aligned along the same line. A plurality of fastening members 101 are respectively inserted into the corresponding first fastening holes 122, the second fastening holes 152, and the third fastening holes 162 so as to fasten the generators 110, the first fastening plate 150, and the second fastening plate 160 to each other.

Particularly, the first fastening plate 150 according to the first exemplary embodiment has the following features. The first fastening plate 150 includes at least one beading unit 153 (e.g., ridge) formed by bending a portion of one surface of the first fastening plate 150, protruded along the thickness direction (i.e., z axis direction of FIG. 1) of the first fastening plate 150. The first fastening plate 150 having a short edge and a long edge may include a plurality of beading units 153 consecutively formed on the same one surface of the first fastening plate 150. The plurality of beading units 153 respectively extend along the short edge direction (i.e., x axis direction of FIG. 1). In addition, the plurality of beading units 153 can be spaced apart in the long edge direction (i.e., y axis direction of FIG. 1), respectively corresponding to the plurality of first separators 130.

In general, a planar plate can be easily bent by pressure applied in the thickness direction when the plate is fixed at two points. Moreover, a thin plate can be more easily bent. According to the first embodiment, when the first fastening plate 150 is fixed at two points in the x axis direction and pressure is applied in the thickness direction to the first fastening plate 150, the first fastening plate 150 is not easily bent due to the beading units 153 according to the present exemplary embodiment. That is, the first fastening plate 150 has stronger structural stiffness due to the beading unit 153 even though the thickness of the first fastening plate 150 is the same as that of the conventional planar plate.

The beading units 153 are positioned between areas where the fastening members 101 are located. Furthermore, the beading units 153 may be positioned near a central line portion of each of the first separators 130. Therefore, the generators 110, the first fastening plate 150, and the second fastening plate 160 are attached to each other, and then fastened with a substantially uniform pressure with low deviation in the conjoining pressure.

Figure 2:
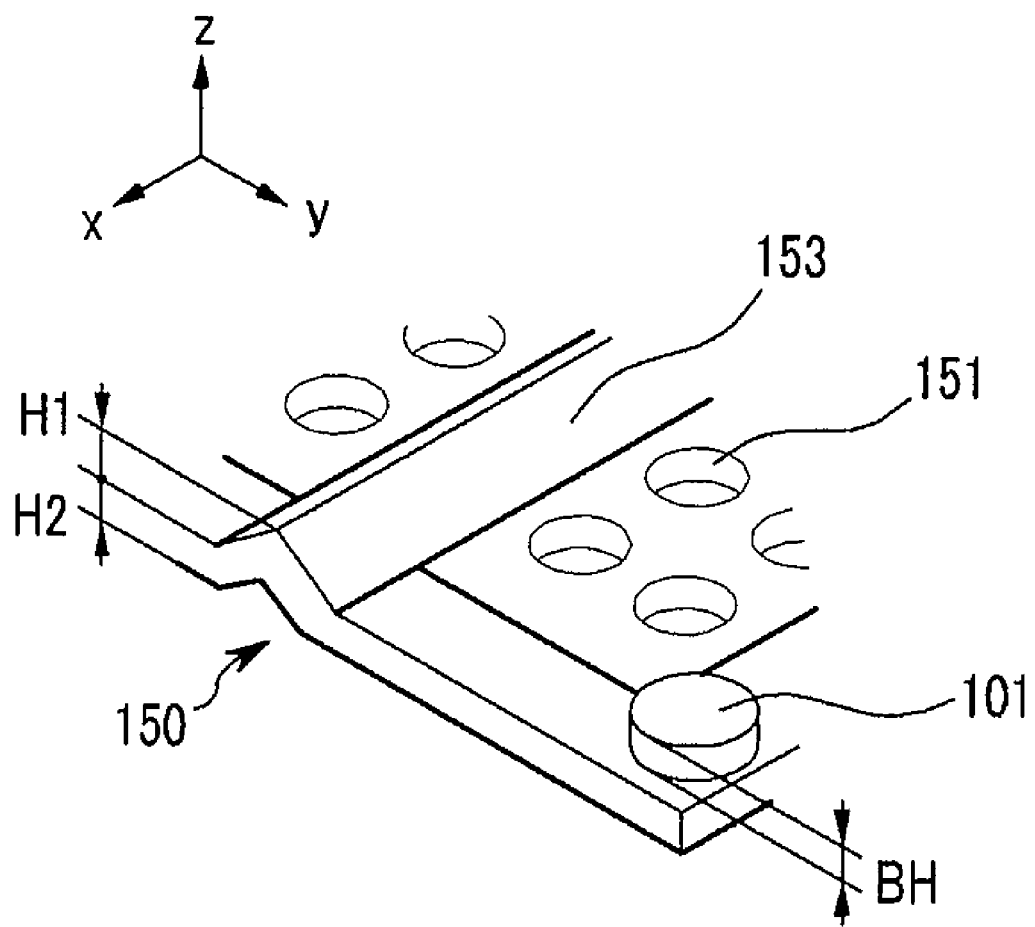
FIG. 2 is an enlarged perspective view of an area A of a fastening plate of FIG. 1.

FIG. 2 is an enlarged perspective view of the first fastening plate 150 of FIG. 1.

In FIG. 2, a protruded height $H_1$ of the beading units 153 is less than a height $H_2$ of the first fastening plate 150. When the height $H_1$ is equal to or greater than the height $H_2$, the structural stiffness of the first fastening plate 150 cannot be effectively increased and the thickness of the overall stack 100 is increased.

In addition, in one embodiment the protruded height $H_1$ of the beading units 153 is less than a head height BH of the fastening member 101 (e.g., a bolt) protruded from the first fastening plate 150. As such, when the head height BH of the fastening member 101 is included in the total thickness of the stack, the protruded height $H_1$ of the beading units 153 does not significantly affect the thickness of the stack.

Figure 3:
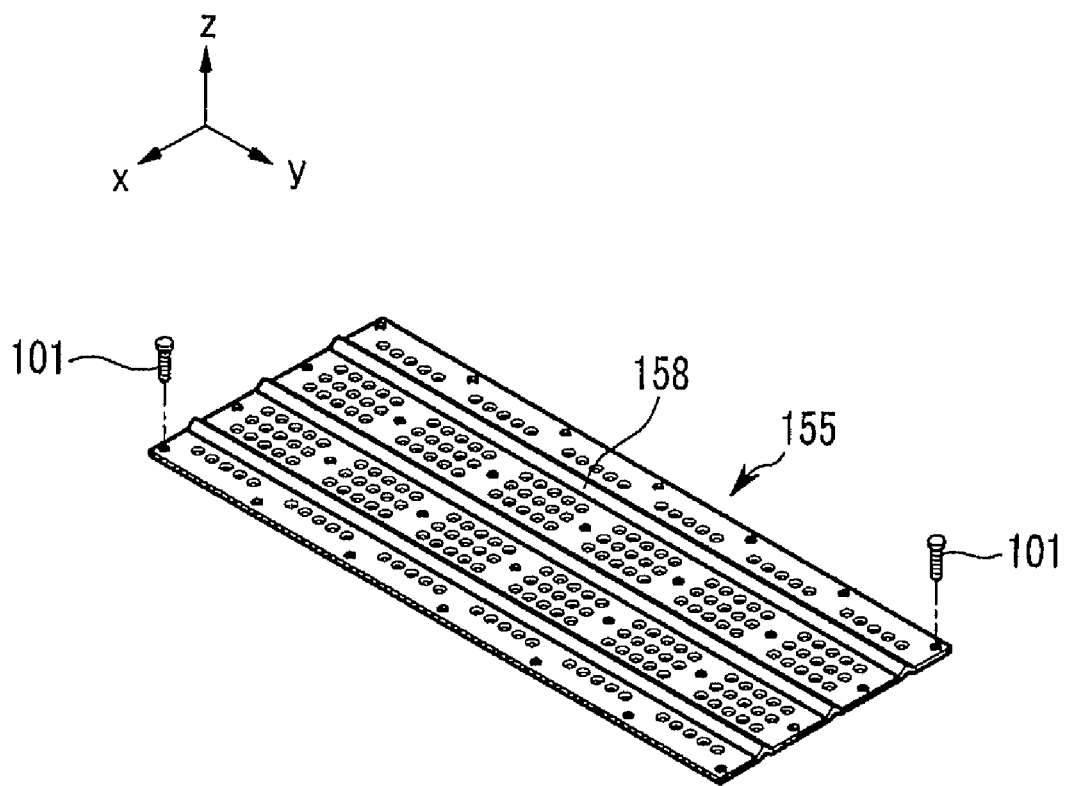
FIG. 3 is a perspective view of a fastening plate having a beading unit extending in a direction that is different from that of the fastening plate of FIG. 1.

FIG. 3 is a perspective view of a first fastening plate 155 having a plurality of beading units 158 extend in a different direction from the beading units 153 of FIG. 1.

As shown in FIG. 3, the beading units 158 according to the present exemplary embodiment extend along a direction that is different from the direction of the beading units 153 of FIG. 1. The beading units 158 extend in a direction in which the first separators 130 of FIG. 1 are consecutively arranged on the same surface. In order words, the beading units 158 extend along the long edge direction (i.e., y axis direction of FIG. 3) of the first fastening plate 155. In addition, the plurality of beading units 158 are spaced apart from each other in the short edge direction (i.e., x axis direction of FIG. 3) of the first fastening plate 155.

Accordingly, the first fastening plate 155 cannot be easily bent due to the beading units 158 when the first fastening plate 155 is fixed at two points in the Y axis direction and pressure is applied to the thickness direction (i.e. z axis direction of FIG. 3) of the first fastening plate 155. As a result, structural stiffness along the y axis direction of the first fastening plate 155 can be improved by the presence of the beading units 158. In addition, the beading units 158 are positioned between points where the fastening members 101 are located.

Although the beading units 153 and 158 according to the present exemplary embodiment respectively extend in one direction (i.e., x axis direction of FIG. 1 or y axis direction of FIG. 3) of the first fastening plates 150 and 155, the beading units 153 and 158 may respectively extend in other directions.

Figure 4:
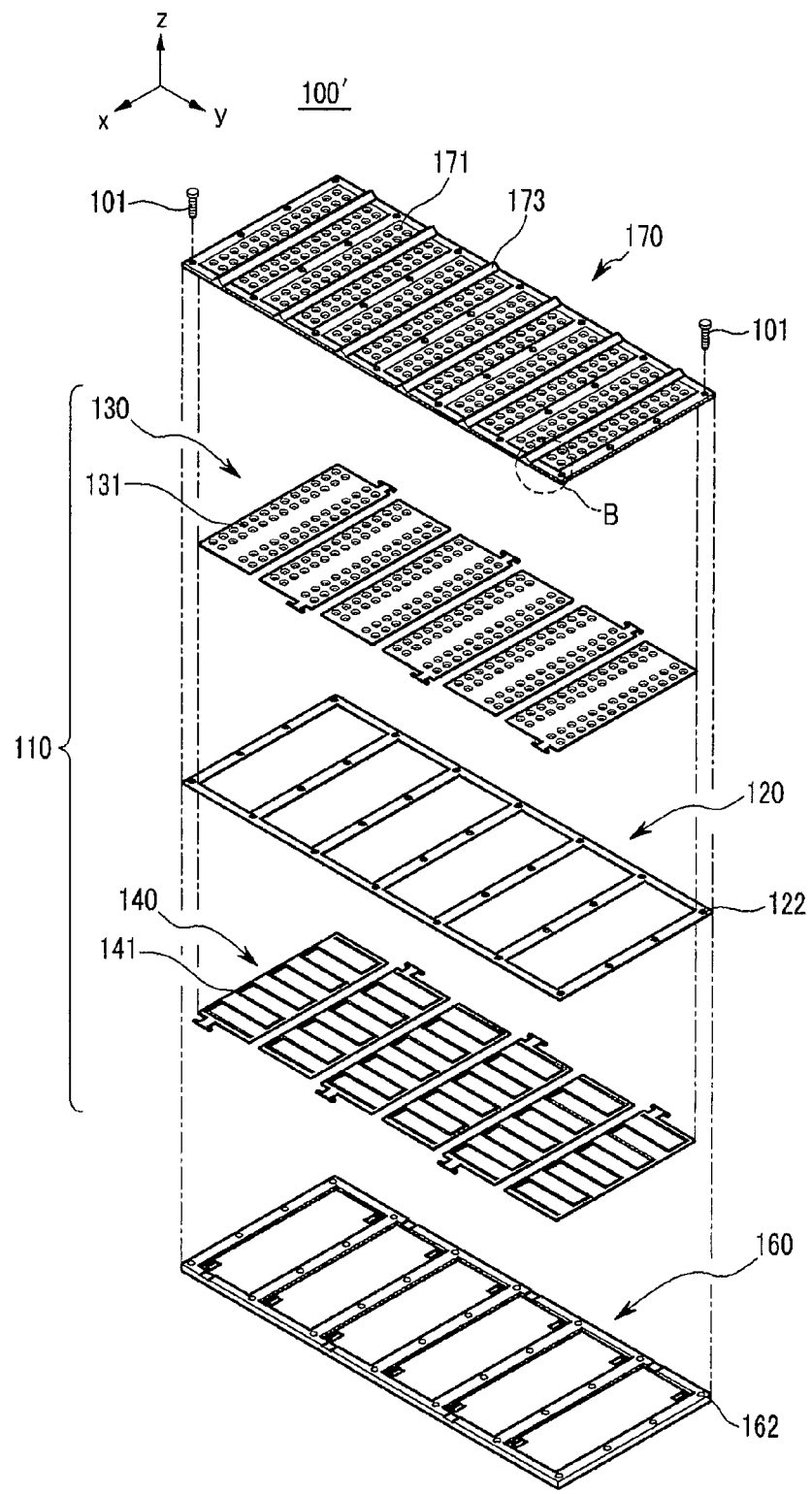
FIG. 4 is an exploded perspective view of a fuel cell stack according to a second exemplary embodiment of the present invention.

FIG. 4 is an exploded perspective view of a fuel cell stack according to a second exemplary embodiment of the present invention.

As shown in FIG. 4, the stack 100' differs from the fuel cell stack 100 of FIG. 1 by having a different first fastening plate 170. The first fastening plate 170 has the following features. The first fastening plate 170 includes a protruding portion 173 formed by bending a portion of one surface of the first fastening plate 170. The protruding portion 173 protrudes along a thickness direction (i.e., z axis direction of FIG. 4) of the first fastening plate 170. The first fastening plate 170 may include a plurality of protruding portions 173 consecutively formed on the same one surface of the first fastening plate 170.

In FIG. 1, the beading units 135 protrudes away from the stack 100 from the one surface of the first fastening plate 150. Concave areas corresponding to the respective beading units 135 are formed on the other surface of the first fastening plate 150 that faces the first separators 130. On the other hand, in FIG. 4, the protruding portions 173 protrude from the one surface of the first fastening plate 170 away from the stack 100', but a surface of the first fastening plate 170 facing the separators 130 is flat.

In FIG. 4, the first fastening plate 170 has a short edge and a long edge. The protruding portion 173 extends along a short edge direction (i.e. x axis direction of FIG. 4) of the first fastening plate 170. A plurality of protruding portions 173, each of which corresponds to the first separators 130 respectively, may be formed on the first fastening plate 170 spaced apart from each other along the long edge direction (i.e. y-axis direction of FIG. 4) of the first fastening plate 170.

Furthermore, the fuel cell stack 100' according to the second exemplary embodiment includes a plurality of fastening members 101 that fasten the first fastening plate 170 and a second fastening plate 160 together, and the protruding portions 173 are positioned between points where the fastening members 101 are located.

Similar to the first fastening plate 150 of the first exemplary embodiment, structural stiffness of the first fastening plate 170 according to the second exemplary embodiment is also improved so that the first fastening plate 170 is not easily bent. In addition, generators 110, the first fastening plate 170, and the second fastening plate 160 can be attached to each other, and then fastened with substantially uniform pressure having a low deviation in the conjoining pressure.

On the first fastening plate 170, a plurality of second oxidant holes 171 are formed on the first fastening plate 170, respectively corresponding to a plurality of oxidant holes 131 of the first separators 130. Therefore, external air can reach a cathode electrode of an MEA 120 through the first and second oxidant holes 131 and 171.

Figure 5:
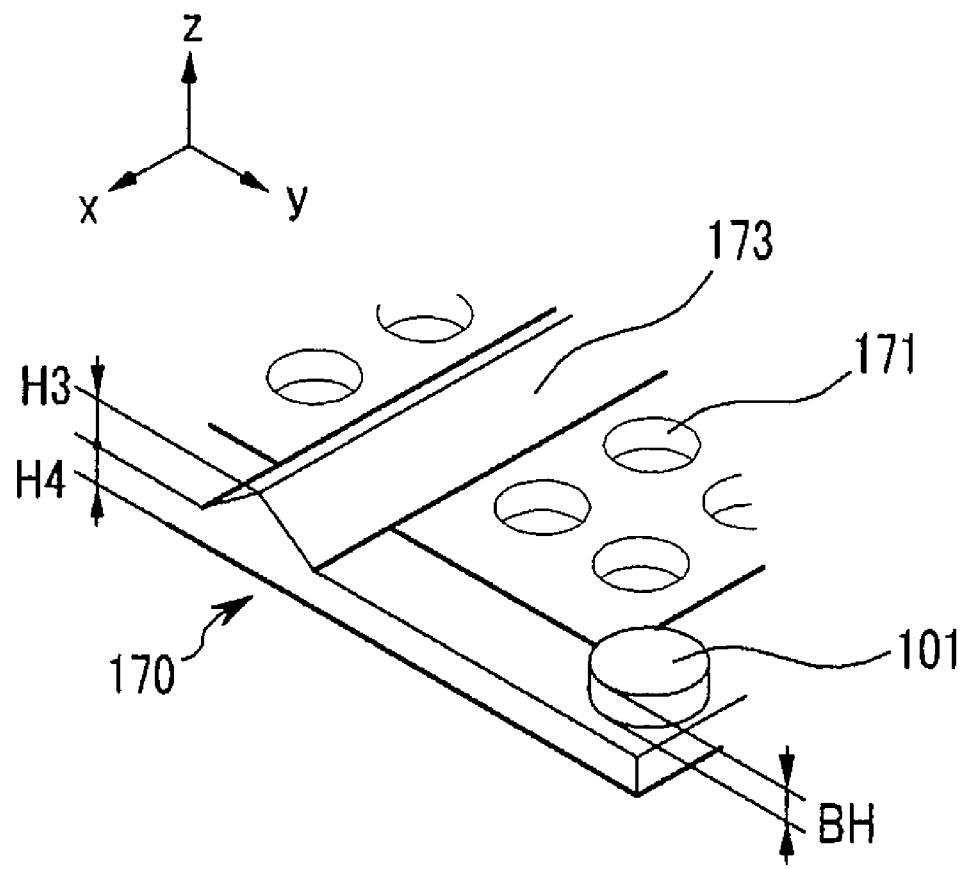
FIG. 5 is an enlarged perspective view of an area B of the fastening plate of FIG. 4.

FIG. 5 is an enlarged perspective view of an area B of the fastening plate 170 of FIG. 4.

In the second exemplary embodiment, a protruded height $H_3$ of the protruding portions 173 is less than the height $H_4$ of the first fastening plate 170. In one embodiment, the protruded height $H_3$ of the protruding portions 173 the first fastening plate 170 is less than a head height BH of the fastening member 101 (e.g., a bolt), protruded from the first fastening plate 170.

Figure 6:
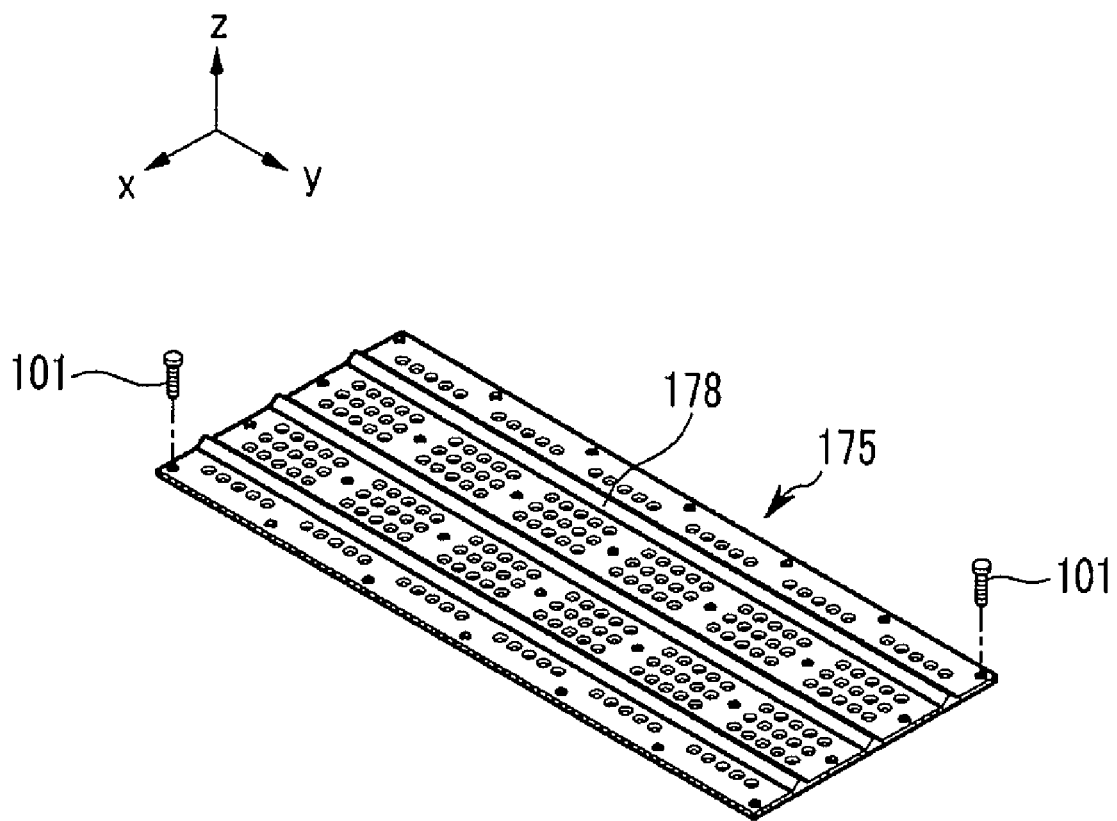
FIG. 6 is a perspective view of a fastening plate having a beading unit extending in a direction that is different from that of the fastening plate of FIG. 4.

FIG. 6 is a perspective view of a fastening plate 175 having protruding portions 178 extending in a different direction from the protruding portions 173 of FIG. 4.

As shown in FIG. 6, protruding portions 178 extend along the long edge direction (i.e., y axis direction of FIG. 6) of the first fastening plate 175. The protruding portions 178 extend in the same direction as the first separators 130 of FIG. 4 are consecutively arranged on the same surface. In addition, the first fastening plate 175 may include a plurality of protruding portions 178 that are spaced apart from each other in the short edge direction (i.e., x axis direction of FIG. 6) of the first fastening plate 175.

Although the protruding portions 173 and 178 according to the present exemplary embodiments respectively extend in one direction (i.e., x axis direction of FIG. 4 or y axis direction of FIG. 6) of the first fastening plates 170 and 175, the protruding portions 173 and 178 may respectively extend in other directions.

Figure 7:
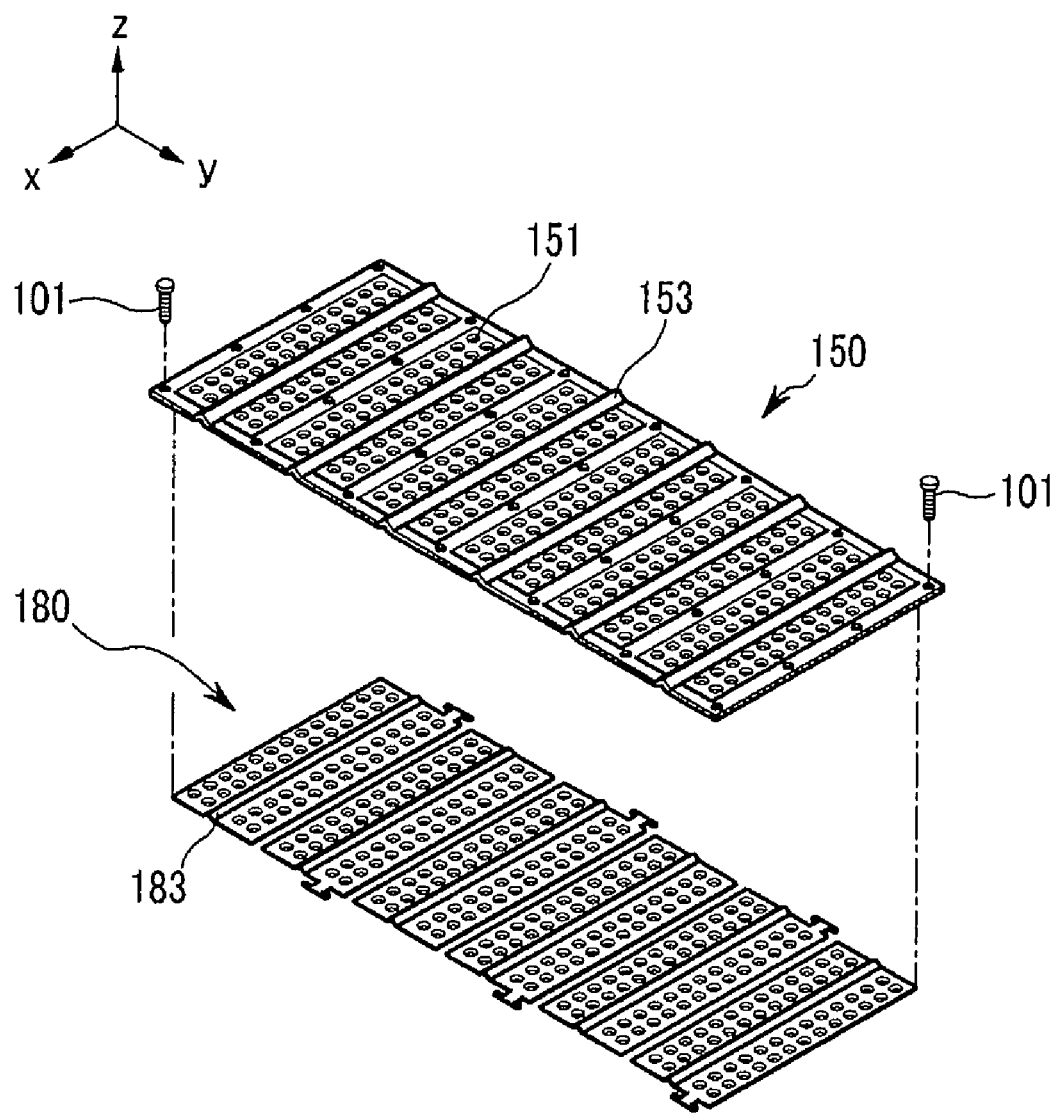
FIG. 7 is an exploded perspective view of a fastening plate and a cathode dividing substrate in a fuel cell stack according to a third exemplary embodiment of the present invention.
Figure 8:
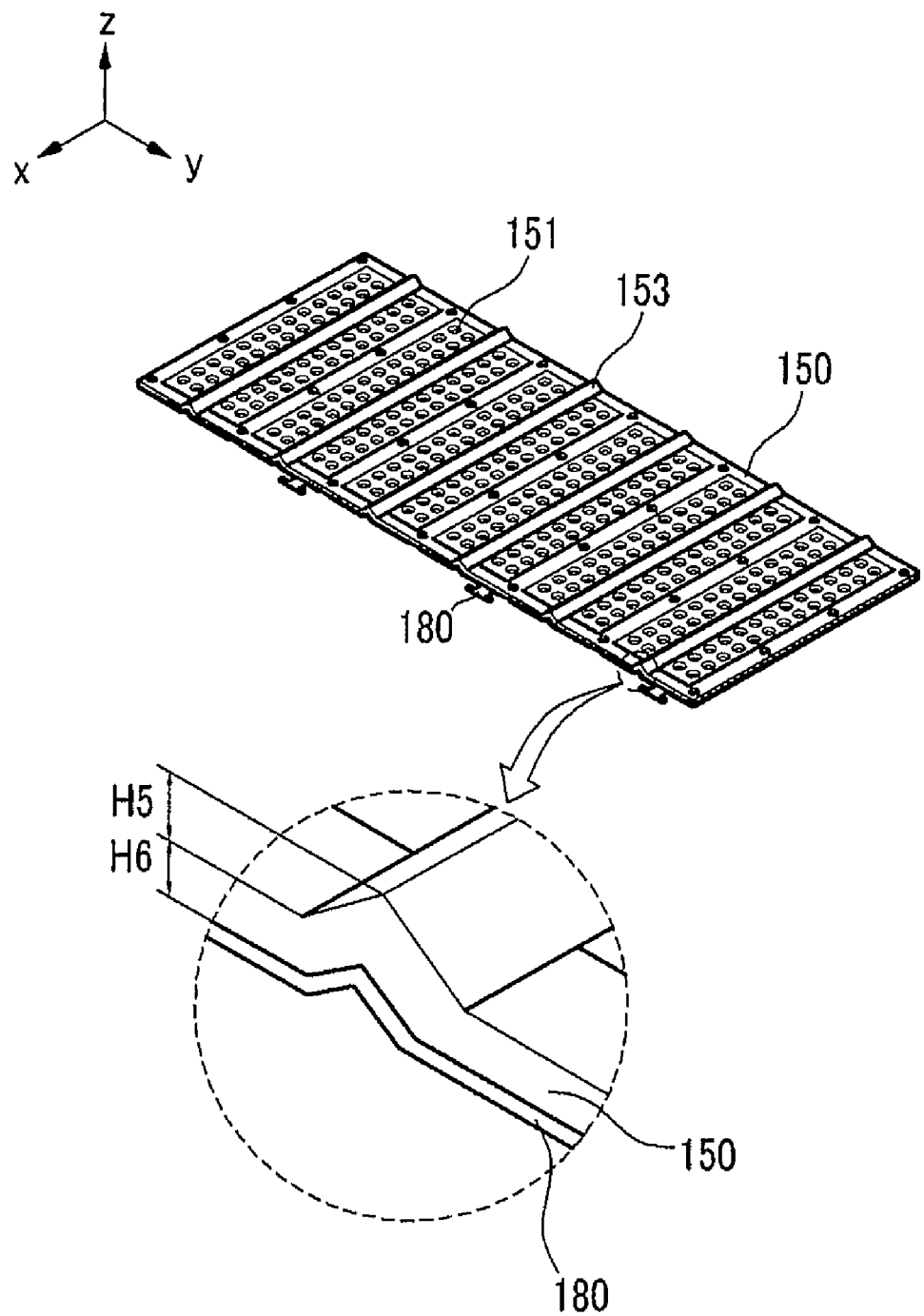
FIG. 8 is a perspective view of the fastening plate and the cathode dividing substrate of FIG. 7 in the accumulated state.

FIG. 7 is a perspective view of the fastening plate 150 and a plurality of first separators 180 of a fuel cell stack according to a third exemplary embodiment of the present invention, and FIG. 8 is a perspective view of the fastening plate 150 and the plurality of first separators 180 of FIG. 7 assembled.

As shown in FIG. 7 and FIG. 8, the stack according to the third exemplary embodiment has the same constituent elements as the stack 100 of FIG. 1, except for a different first separator 180. A beading unit according to the third exemplary embodiment will be referred to as a first beading unit 153. A plurality of first beading units 153 are consecutively formed on the same surface of the first fastening plate 150. In addition, the first separator 180 includes a second beading unit 183 formed by bending a portion of one surface of the first separator 180, protruded along the thickness direction (i.e., z axis direction of FIG. 7) of the first separator 180. The first separator 180 may include a plurality of second beading units 183 consecutively formed on the same surface of the first separator 180, and the plurality of second beading units 183 match respective concave portions of the first beading units 153 on the first fastening plate 150. The first separator 180 may include a plurality of first separators 180 which may respectively include a plurality of second beading units 183.

The stack according to the third exemplary embodiment further includes a plurality of fastening members 101 for fastening the first fastening plate 150 and a second fastening plate. The first beading units 153 and the second beading units 183 are located between points where the fastening members 101 are located.

Similar to the first and second exemplary embodiments, the first fastening plate 150 has improved resistance to bending, so that the stack of the third exemplary embodiment has increased structural stiffness so that the first fastening plate 150 cannot be easily bent. In addition, since the first beading units 153 match the second beading units 183, the bending stiffness of the first separators 180 are further enhanced when the first separators 180 and the first fastening plate are assembled together. As a result, the first separators 180, the first fastening plate 150, and the second fastening plate of the stack can be attached to each other with substantially uniform conjoining pressure with low deviation according to the third exemplary embodiment of the present invention.

Referring to FIG. 8, in the third exemplary embodiment, a protruded height $H_5$ of the beading units 183 is less than a height $H_6$ of the first separator 180.

As described above, the fuel cell stacks structured according to the exemplary embodiments of the present invention have improved structural stiffness and substantially uniform conjoining pressure between the constituent components.

In addition, the enhanced structural stiffness of the fastening plates and the separators according to the exemplary embodiments of the present invention allows the construction of a stack thinner than a conventional planar stack.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and their equivalents.

What is claimed is:

1. A fuel cell stack, comprising:
a plurality of generators each comprising:
a membrane-electrode assembly (MEA);
a first separator on one side of the MEA and having an oxidant hole for receiving an oxidizing agent; and
a second separator on the other side of the MEA having a fuel channel on a side facing the MEA,
wherein the plurality of generators are consecutively on different locations of a same plane, respectively, the same plane substantially parallel to at least one of the one side or the other side of the MEA;
a first fastening plate on one side of the generators for covering the first separators; and
a second fastening plate on the other side of the generators for covering the second separators,
wherein the first fastening plate comprises a beading unit configured as a bent portion of the first fastening plate, the beading unit protruding from the first fastening plate in a thickness direction of the first fastening plate, the thickness direction substantially perpendicular to the same plane, and
wherein the first separator comprises a second beading unit configured as a bent portion of the first separator, the second beading unit protruding from the first separator in a thickness direction of the first separator, the second beading unit matching a concave portion of the beading unit of the first fastening plate.

2. The fuel cell stack of claim 1, wherein the first fastening plate has a short edge and a long edge, and wherein the beading unit extends in a direction parallel to the short edge.

3. The fuel cell stack of claim 2, wherein the first fastening plate further comprises a plurality of beading units extending in the direction parallel to the short edge and spaced from each other in a direction parallel to the long edge, the plurality of beading units respectively corresponding to the first separators.

4. The fuel cell stack of claim 3, further comprising a plurality of fastening members for fastening the plurality of generators, the first fastening plate, and the second fastening plate,
wherein the beading units are positioned between points where the fastening members are located.

5. The fuel cell stack of claim 1, wherein the first fastening plate has a short edge and a long edge, and wherein the beading unit extends in a direction parallel to the long edge.

6. The fuel cell stack of claim 5, wherein the first fastening plate further comprises a plurality of beading units extending in the direction parallel to the long edge and spaced from each other in a direction parallel to the short edge.

7. The fuel cell stack of claim 6, further comprising a plurality of fastening members for fastening the plurality of generators, the first fastening plate, and the second fastening plate,
wherein the beading units are positioned between points where the fastening members are located.

8. The fuel cell stack of claim 1, wherein a protruded height of the beading unit is less than a thickness of the first fastening plate.

9. The fuel cell stack of claim 1, further comprising a plurality of bolts for coupling the generator, the first fastening plate, and the second fastening plate,
wherein a protruded height of the beading unit is less than a head height of the respective bolts protruded from the first fastening plate.

10. The fuel cell stack of claim 1, wherein each first separator has a short edge and a long edge, wherein the plurality of first separators respectively comprise a plurality of second beading units extending in a direction parallel to the respective long edges and spaced from each other in a direction parallel to the respective short edges.

11. The fuel cell stack of claim 10, further comprising a plurality of fastening members for fastening the generators, the first fastening plate, and the second fastening plate, wherein the beading units and the second beading units are positioned between points where the fastening members are located.

12. The fuel cell stack of claim 1, wherein the beading unit is positioned at a central line portion of a corresponding one of the first separators.

13. A fuel cell stack, comprising:
a plurality of generators each comprising:
a membrane-electrode assembly (MEA);
a first separator on one side of the MEA and having an oxidant hole for receiving an oxidant agent; and
a second separator on the other side of the MEA having a fuel channel on a side facing the MEA,
wherein the plurality of generators are consecutively on different locations of a same plane, respectively, the same plane substantially parallel to at least one of the one side or the other side of the MEA;
a first fastening plate on one side of the generators for covering the plurality of first separators; and
a second fastening plate on the other side of the generators for covering the plurality of second separators, wherein the first fastening plate comprises a protruding portion on its side, the protruding portion protruding from the first fastening plate in a thickness direction of the first fastening plate, the thickness direction substantially perpendicular to the same plane, and wherein the first separator comprises a second beading unit configured as a bent portion of the first separator, the beading unit protruding from the first separator in a thickness direction of the first separator, the beading unit matching a concave portion of the protruding portion.

14. The fuel cell stack of claim 13, wherein the first fastening plate has a short edge and a long edge, wherein the protruding portion extends in a direction parallel to the short edge.

15. The fuel cell stack of claim 14, wherein the first fastening plate further comprises a plurality of protruding portions extending in the direction parallel to the short edge and spaced from each other in a direction parallel to the long edge, the plurality of protruding portions respectively corresponding to the first separators.

16. The fuel cell stack of claim 15, further comprising a plurality of fastening members for fastening the generators, the first fastening plate, and the second fastening plate, wherein the protruding portions are positioned between points where the fastening members are located.

17. The fuel cell stack of claim 13, wherein the first fastening plate has a short edge and a long edge, wherein the protruding portion extends in a direction parallel to the long edge.

18. The fuel cell stack of claim 17, wherein the first fastening plate further comprises a plurality of protruding portions extending in the direction parallel to the long edge and spaced from each other in a direction parallel to the short edge.

19. The fuel cell stack of claim 18, further comprising a plurality of fastening members for fastening the generators, the first fastening plate, and the second fastening plate, wherein the protruding portions are positioned between points where the fastening members are located.

20. The fuel cell stack of claim 13, wherein a protruded height of the protruding portion is less than a thickness of the first fastening plate.

21. The fuel cell stack of claim 13, further comprising a plurality of bolts for coupling the generators, the first fastening plate, and the second fastening plate, wherein a protruded height of the protruded portion is less than a head height of the respective bolts protruded from the first fastening plate.

* * * * *